United States Patent [19]
Andersson

[11] 3,901,613
[45] Aug. 26, 1975

[54] UNIVERSAL JOINTING ARRANGEMENT FOR TUBULAR PROFILES

[75] Inventor: Stig Olof Anderson, Gnosjo, Sweden

[73] Assignee: Sture Svensson, Hillerstorp, Sweden

[22] Filed: Oct. 11, 1973

[21] Appl. No.: 405,533

[30] Foreign Application Priority Data
Oct. 12, 1972  Sweden .......................... 13153/72
Mar. 16, 1973  Sweden .......................... 7303713

[52] U.S. Cl. ............... 403/406; 403/171; 403/174; 403/178; 52/656
[51] Int. Cl. ............................................. F16b 7/04
[58] Field of Search ........... 403/170, 171, 172, 174, 403/176, 178, 205, 231, 295, 297, 401, 406; 52/758 H, 753 C, 753 D, 758 F, 656; 85/3

[56] References Cited
UNITED STATES PATENTS

| | | | |
|---|---|---|---|
| 2,233,962 | 3/1941 | Rover | 403/3 |
| 2,839,320 | 6/1958 | Hill | 403/172 |
| 3,429,351 | 2/1969 | Szalanczy | 85/1 R X |
| 3,574,378 | 4/1971 | Heywood | 52/758 H |

FOREIGN PATENTS OR APPLICATIONS

| | | | |
|---|---|---|---|
| 664,763 | 6/1965 | Belgium | 403/297 |
| 1,469,957 | 1/1967 | France | 403/205 |
| 1,473,856 | 2/1967 | France | 403/297 |
| 1,245,649 | 6/1967 | Germany | 403/297 |
| 354,239 | 7/1961 | Italy | 403/205 |

Primary Examiner—Richard J. Scanlan, Jr.
Assistant Examiner—Wayne L. Shedd
Attorney, Agent, or Firm—Howson and Howson

[57] ABSTRACT

A universal joint assembly for tubular members for use as structural elements for furniture or the like characterized in that the jointing assembly comprises a central module body shaped as a cube, each face of the cube having a circular cavity or recess and at least one connector piece. The connector piece is provided with a circular projection fitting into any one of the circular recesses of the module body. A jointing screw engages through a hole in the connector and is received in a threaded bore in the module body to securely fasten the connector piece to the module body.

9 Claims, 30 Drawing Figures

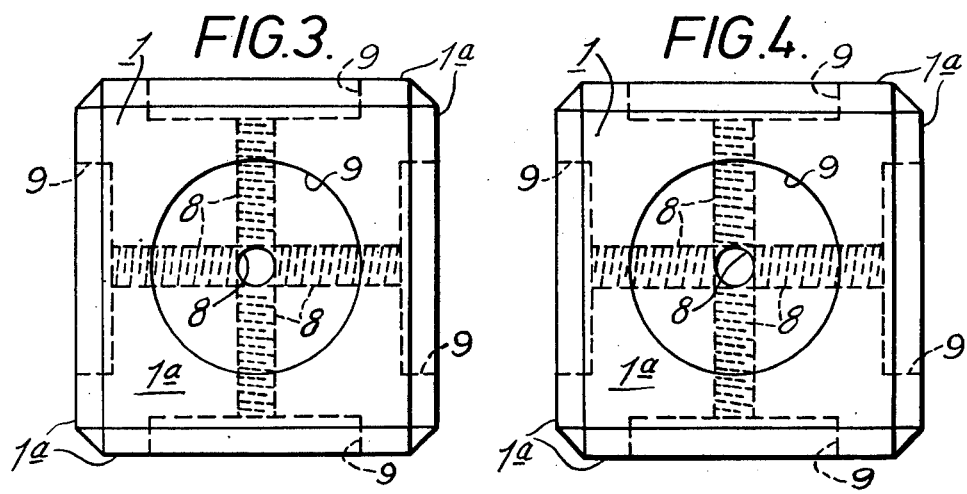
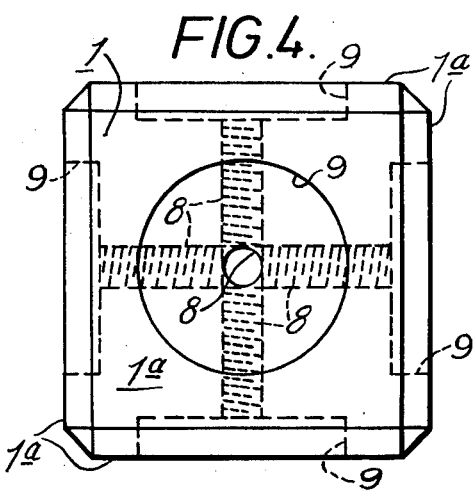
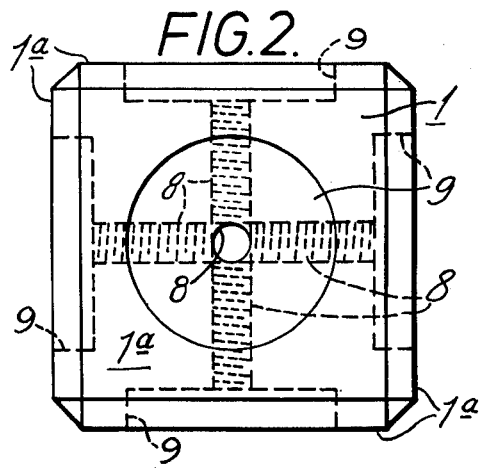
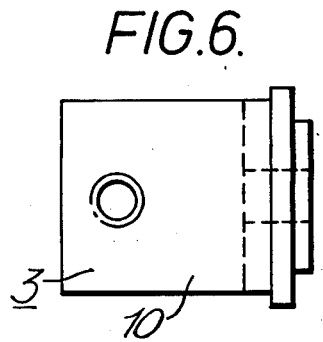
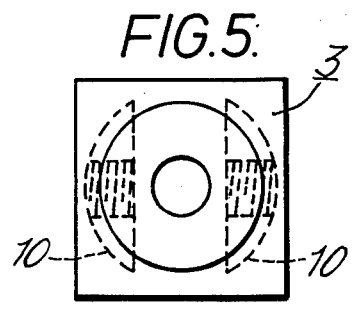
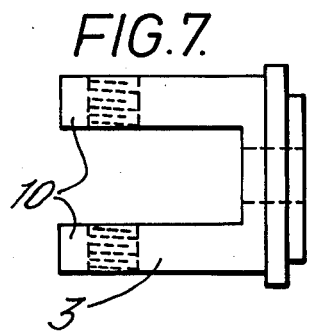

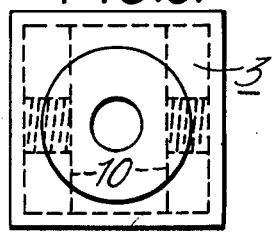
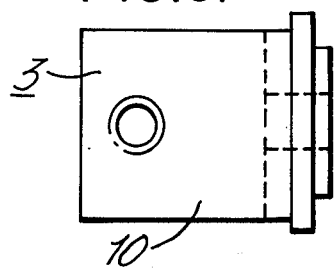
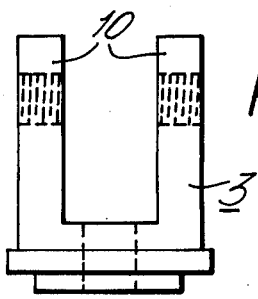
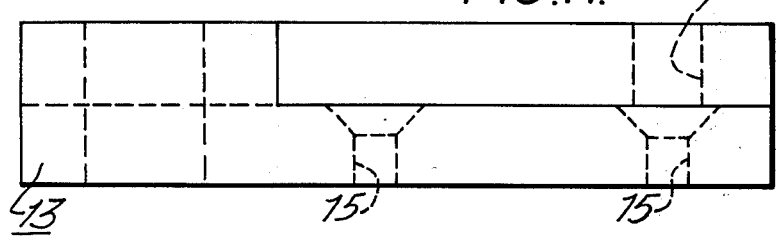
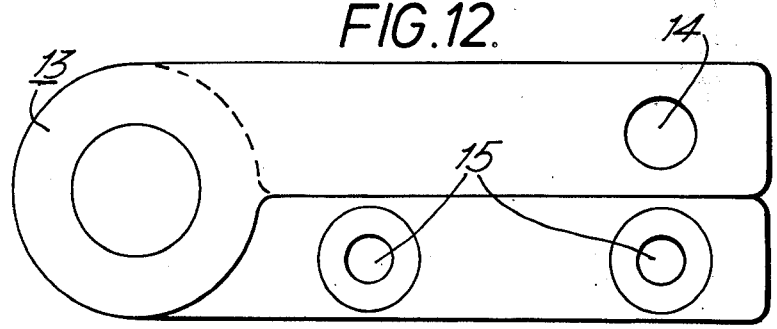

UNIVERSAL JOINTING ARRANGEMENT FOR TUBULAR PROFILES

BACKGROUND OF THE INVENTION

The present invention relates to a universal jointing assembly for tubular members for use as structural elements or the like, for example, for furniture. The present jointing assembly provides an advantage over previously known jointing arrangements in that in the overall assembly, the exterior provides smooth surfaces which do not have a tendency to be obstructions and whereby the overall appearance of the jointing arrangement gives a pleasing aesthetic impression. The jointing arrangement is also very useful in that it can be employed to secure a plurality of tubular members in a variety of patterns and thus provide many useful applications depending on the structural needs of a given assembly. The present invention provides a jointing assembly which has a wide field of applicability extending from furniture of all kinds such as tables, work desks and the like to partition walls for rooms, scaffolding and the main structural elements of buildings. The jointing arrangement is very easy to assemble and disassemble and thus, provides a great degree of flexibility for rearranging a given structural assembly.

The jointing assembly of the present invention is intended for construction of structural members such as rorund or square shaped tubes and is characterized by a central module body which in the embodiments illustrated is shaped as a cube having six square-shaped faces of the same size, each face being shaped with a circular cavity or recess having a threaded opening in the center thereof to receive a screw. The jointing assembly further comprises at least one connector piece provided with a circular projection fitting into any one of the circular recesses of the module body and a jointing screw engaging through said connector piece and receivable in the threaded opening in the module body for assembling the connector piece thereto.

In one form of the invention the connector piece is of generally U-shaped configuration defining two legs provided with threaded openings for receiving two locking screws which are aligned and which when rotated form an expansion lock to distend the legs of the connector to firmly engage inside a tubular member or the like, the tubular member having openings aligned with the threaded holes in the connector piece to facilitate tightening thereof with a fastening device such as a wrench or the like.

The locking screws may be provided with internal threads to receive a pin or the like arranged to cooperate with, for example, a snap-lock for a table top or a hinge for a door.

In accordance with another embodiment of the invention to facilitate assembly of structural tubular members having circular or square cross section, the module body and connector piece are provided with at least one, and preferably four, circular recesses to accommodate a cover plate therebetween. The opposite faces of the cover plate is similarly provided with a series of projections corresponding in number to the projections in the module body and connector piece so that when assembled, the connector piece cannot be rotated relative to the module body. The cover plate may be provided with a central cavity which extends only a portion of the thickness thereof and which is easily removable to facilitate assembly of a connecting screw to attach the connector piece. The cover plate provides security against rotation of the connector piece whereby in turn the tubular member is secured against rotation by the distended legs of the connector piece. Thus, there is provided a rigid assembly.

In some instances where only one type of connector piece having a circular cross section is used, the connector piece may be adapted to a tubular member of square cross section by a supplemental adaptor member of a configuration to surround the circular connector piece and including four longitudinally extending branches or legs which on their interior periphery are shaped to complement the arcuate outer periphery of the connector piece and define an outer member which is square shaped. The legs are connected to the supplemental adaptor by four bars, two of which have a dimension permitting expansion and two are shaped as guide members for fitting between the legs of the connector piece. In this manner the tubular member having square cross section is prevented from turning relative to the connector piece.

BRIEF DESCRIPTION OF THE DRAWINGS

The above objects and others are hereinafter more fully set forth with reference to the accompanying drawings wherein:

FIGS. 2–4 inclusive are elevational views of the top, bottom and side faces of the module body;

FIGS. 5–7 inclusive are views showing one form of connector piece;

FIGS. 8–10 inclusive are views of a connector piece for use with a tubular member having a square cross section;

FIGS. 11 and 12 are side and top plan views for a hinge for a jointing assembly in accordance with the present invention;

FIGS. 21 and 22 are side and top views of a screw member for a table top or the like;

DESCRIPTION OF THE PREFERRED EMBODIMENTS

Figure 1:
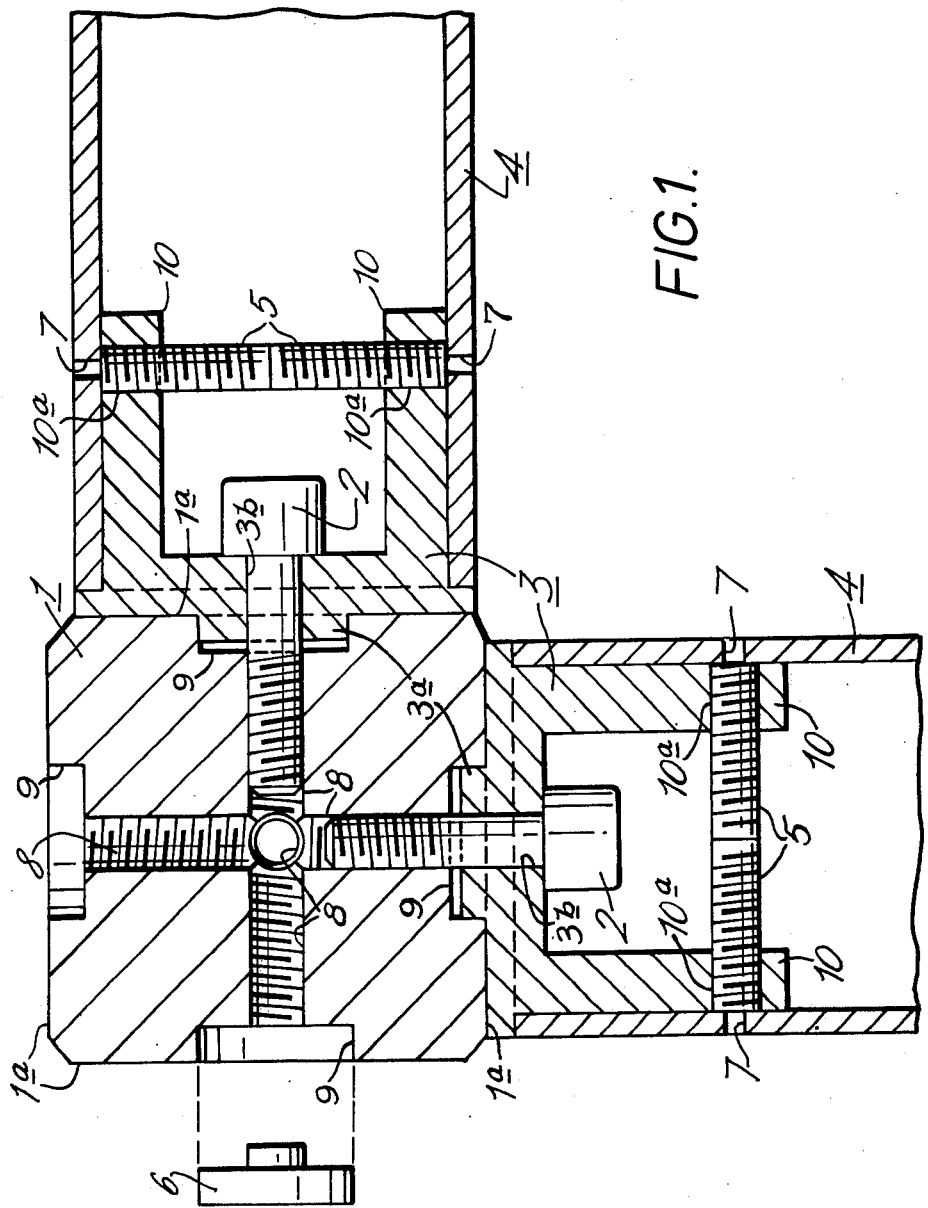
FIG. 1 is a sectional view of a jointing assembly in accordance with the present invention illustrating a pair of tubular members connected to the module body by the connector pieces.
Figure 13:
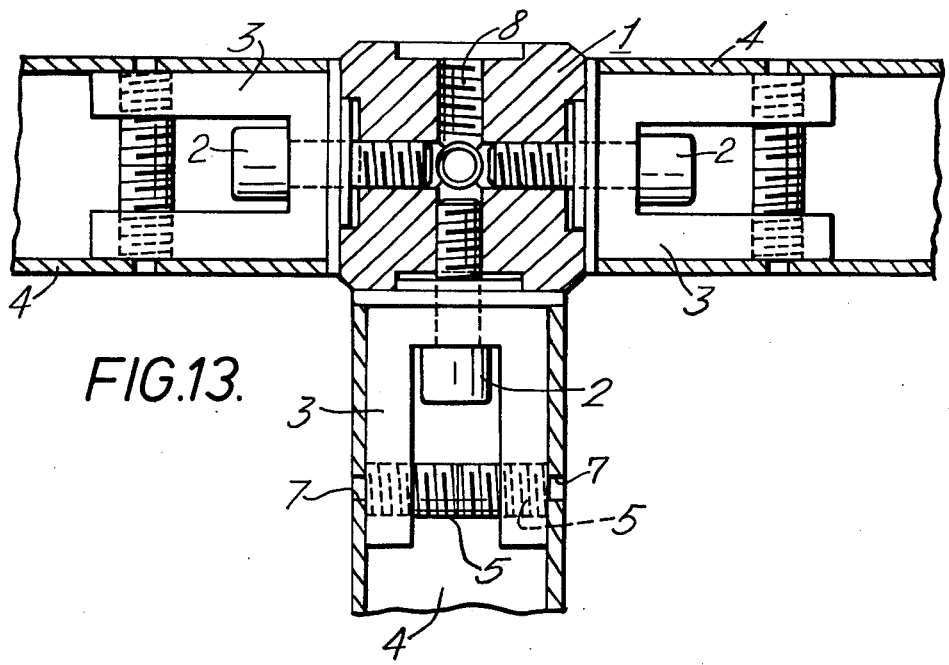
FIG. 13 is a sectional view of an assembly including three tubular members connected to a module body.

Referring now to the drawings and particularly FIG. 1 thereof, there is illustrated a universal jointing assembly in accordance with the present invention. The assembly comprises a module body 1 which is preferably shaped as a cube having in the present instance six faces 1a of generally square shaped configuration, each face being provided with a circular cavity or recess 9 extending into the module body and a threaded opening 8 disposed centrally of the cavity 9.

The assembly further includes a connector piece or element 3 which may be made of aluminum or plastic and impregnated with glass fibers. As illustrated, the connector piece 3 is adapted to be secured to one face of the module body by means of a screw member 2 and to this end the connector piece is provided with a projection 3a which is of a configuration to seat in the recess 9 of the module body. The connector piece has an opening 3b for the screw to facilitate assembly to the module body in the manner illustrated in FIG. 1.

Figure 14:
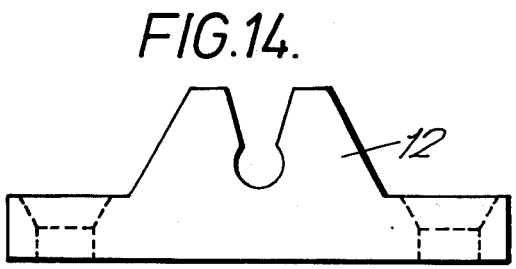
FIGS. 14–16 are views of a snap lock for assembly with a jointing arrangement in accordance with the present invention to fasten, for example, a table top thereto.
Figure 15:
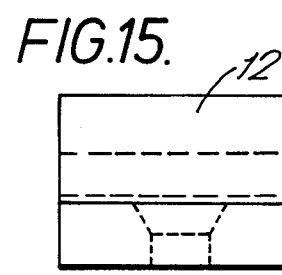
Figure 16:
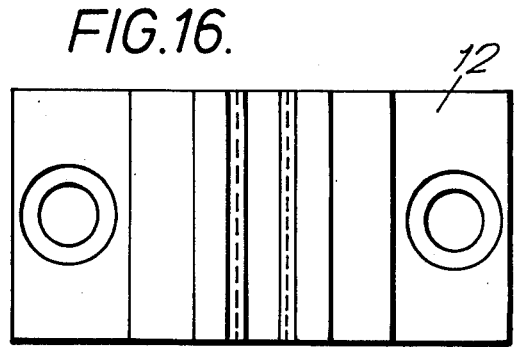
Figure 17:
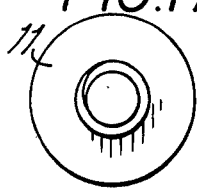
FIGS. 17 and 18 are plan and side elevational views of a pin intended to secure the snap lock according to FIGS. 14–16 inclusive or the hinge assembly of FIGS. 11 and 12.
Figure 18:
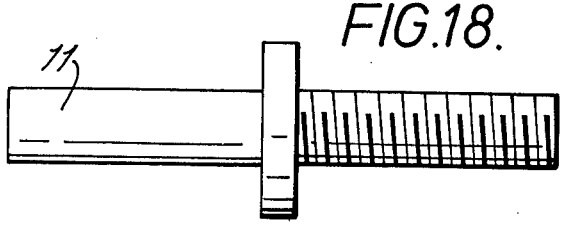
Figure 19:
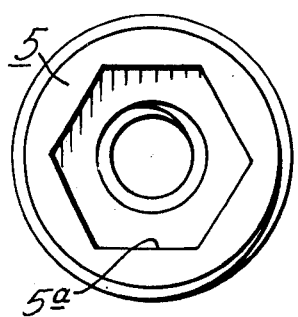
FIGS. 19 and 20 are top and side elevational views of an expansion screw for the connector piece.
Figure 20:
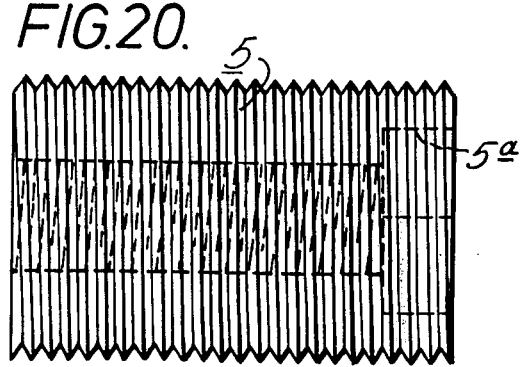
Figure 21:
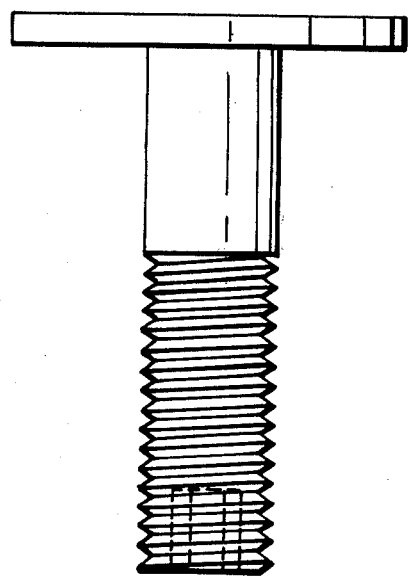
Figure 22:
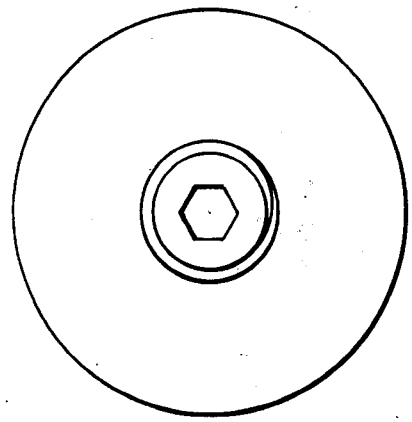

A tubular member 4 made of aluminum, steel or the like, and having a circular or square shaped cross section is adapted to be supported on the connector piece 3 by a clamping action. To this end the connector piece is provided with at least a pair of diametrically opposed legs 10, the outer extremities of which are provided with threaded recesses 10a to receive a pair of locking screws 5. The tubular members as illustrated are provided with diametrically opposed holes 7 which align with the axial end faces of the locking screws 5 to facilitate turning of the screws. As illustrated, one end of each locking screw has a hexagonal socket 5a to receive a tool for tightening the screws. Each locking screw may also be provided with an internal threaded bore as shown, for example, in FIGS. 19 and 20 to facilitate assembly of a threaded pin of the type shown in FIGS. 17 and 18. This pin may be used to support a snap lock of the type shown in FIGS. 14 and 15 or a hinge. The locking pin 11 can also be used as a holder for a hinge 13 of the type, which is shown in FIGS. 11 and 12, whereby 14 designates a hole for the locking pin 11 and 15 designates holes for screws, which in turn hold a door or the like in place.

The legs 10 of the connector piece may have a rounded outer profile surface container as shown in FIGS. 5–7 inclusive to facilitate assembly of a tubular member having a circular cross section or the legs may be generally rectangular in form to facilitate assembly to tubular members having a square or rectangular cross section (See FIGS. 8, 9, and 10).

Figure 23:
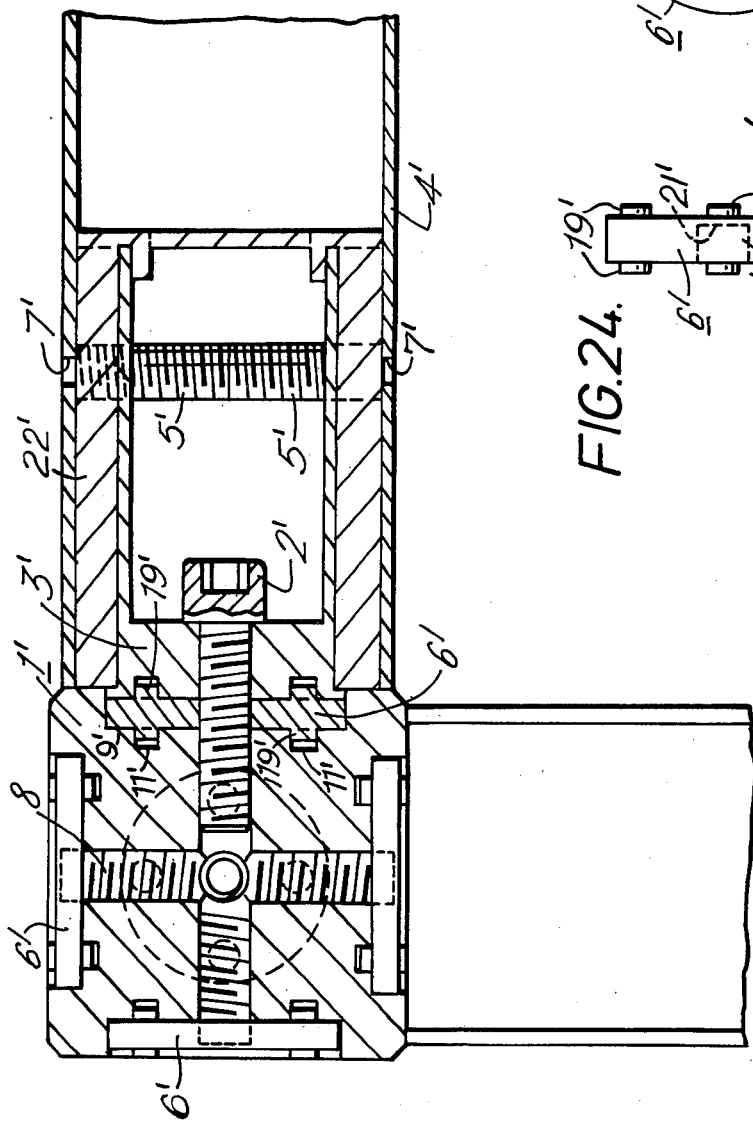
FIG. 23 is a sectional view of another embodiment of jointing assembly in accordance with the present invention.
Figure 25:
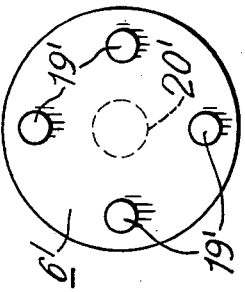
FIGS. 24 and 25 are side and end views of a cover plate for the jointing assembly of FIG. 23.
Figure 24:
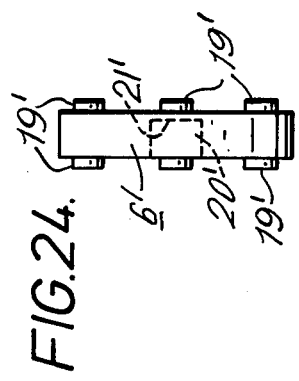
Figure 27:
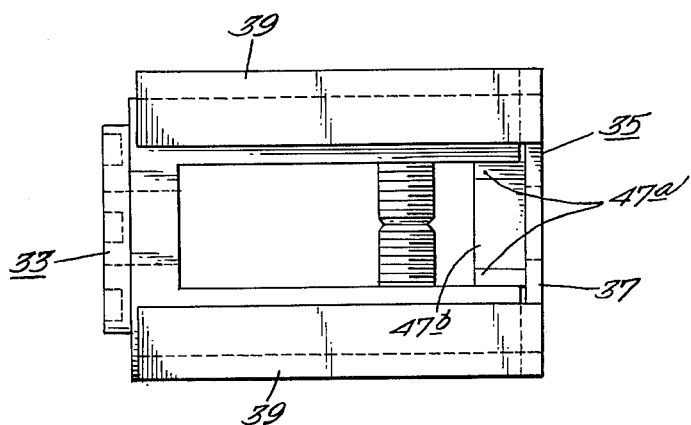
FIG. 27 is a plan view of the embodiment of FIG. 26.
Figure 28:
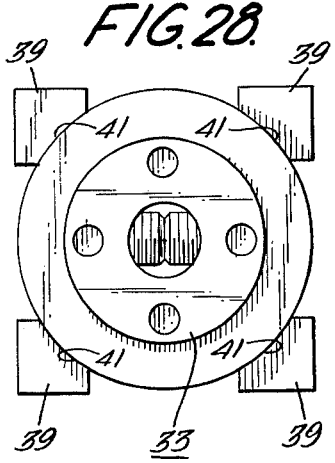
FIGS. 28 and 29 are left and right end elevational views respectively of the jointing arrangement of FIG. 26.
Figure 26:
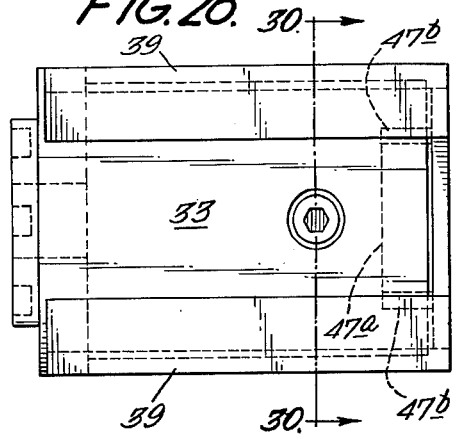
FIG. 26 is a side elevational view of a modified form of a connector piece in accordance with the present invention.
Figure 29:
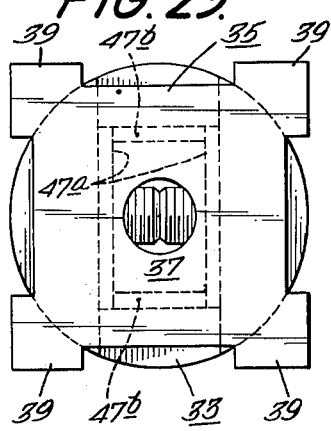
Figure 30:
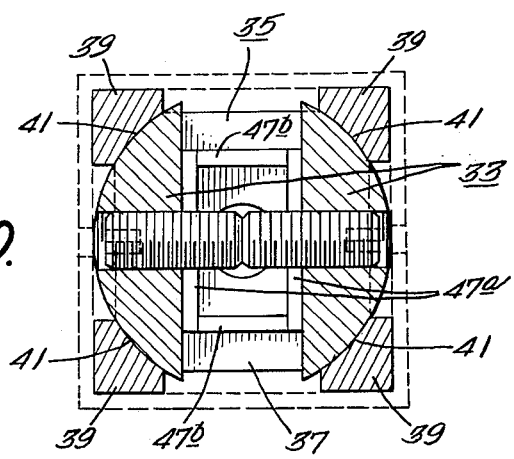
FIG. 30 is a sectional view taken on lines 30—30 of FIG. 26.

There is illustrated in FIGS. 23–25 inclusive a modified jointing assembly in accordance with the present invention. The assembly includes a module body 1', a connector piece 3', and tubular members 4' adapted to be supported on the module by connector screw 2'. In the present instance, the assembly further includes a cover plate member 6' having a plurality of aligned projections 19' projecting from opposite faces thereof. The cover plate engages between the module body 1' and the connector member 3' to prevent relative twisting or rotation therebetween. To this end the cavities 9' in the face of the module body has a series of recesses 11' corresponding in number to the projections on the cover plate to receive the same. Similarly, the confronting face of the connector piece 3' has recesses corresponding in shape and number to the projections 19' on the cover plate. As illustrated in FIG. 24, the cover plate has a central recess 20' which is closed at its lower end by a thin membrane 21' which is easily rupturable when necessary to provide a clearance hole for the screws 2'. Also, in this embodiment of the invention, there is provided an adaptor member 22' which circumscribes the connector piece and has an outer periphery conforming in shape to the interior periphery of the tubular member, the adaptor also having openings to accomodate the locking screws 5.

FIGS. 26–30 inclusive show another modified arrangement of the jointing assembly in accordance with the present invention. In this embodiment, the connector piece 33 has a circular outer contour and an adaptor 35 is provided to facilitate use of the circular connector piece with tubular members having a rectangular or square cross section. To this end the adaptor 35 consists of a web 37 at one axial end and four post members 39 projecting from the web 37 which have a suitably contoured inner face 41 to snugly embrace the connector piece 33 and sharp right angled outer face portions which conform to the corners of a tubular member in the manner illustrated in FIG. 30. The web mounts depending bars 47a, the bars 47a having such a dimension that they permit some expansion while the oppositely disposed bars 47b are shaped as guides for fitting between the legs of the connector piece 33.

What is claimed is:

1. Universal jointing assembly comprising a module body having a plurality of faces, means defining a recess in each of the faces of said module body, at least one connector piece having a projection engaged in one of said recesses and at least one pair of leg members, a jointing screw member securing said connector piece to said module body, at least one tubular member telescopically engaged over said connector piece and means for expanding said legs members to engage the interior walls of said tubular member.

2. Universal jointing assembly as claimed in claim 1 wherein said module body member is shaped as a cube having six substantially square shaped faces.

3. Universal jointing assembly as claimed in claim 2 wherein said adaptor includes four post members having an inner surface conforming to said connector piece and right angled outer face portions conforming to the corners of a tubular member of square cross section, said post members connected to a web overlying the axial end of said connector piece.

4. Universal jointing assembly as claimed in claim 1 wherein said connector piece is of generally U-shaped cross section defining the leg members and including means defining a pair of aligned threaded openings in said leg members, said expanding member comprising screws threaded in said aligned openings and engaging one another to form an expansion lock expanding said leg members into firm gripping engagement with the tubular member.

5. Universal jointing assembly as claimed in claim 1 wherein said tubular member is provided with openings to facilitate access to rotate said locking screws.

6. Universal jointing assembly as claimed in claim 4 wherein each locking screw is internally threaded to receive a pin member for supporting a snap lock or a hinge.

7. Universal jointing assembly as claimed in claim 1 wherein said recess is provided with at least one smaller opening and including a cover plate member having at least one projection engaged in said opening.

8. Universal jointing assembly as claimed in claim 7 wherein said cover plate is provided with a central cavity having a thin removable bottom wall.

9. Universal jointing assembly as claimed in claim 1 wherein said connector piece is of generally circular cross section and wherein said tubular member is of non-circular cross-section and includes an adaptor having an inner configuration conforming to the exterior surface of said connector piece and an exterior configuration conforming to the non-circular cross-section of said tubular member and means securing said adaptor to said connector piece and said tubular member to said adaptor.

* * * * *